United States Patent
Jo et al.

(10) Patent No.: US 11,863,945 B2
(45) Date of Patent: Jan. 2, 2024

(54) AUGMENTED REALITY WEARABLE ELECTRONIC DEVICE AND CASE

(71) Applicant: SAMSUNG ELECTRONICS CO., LTD., Suwon-si (KR)

(72) Inventors: Nammin Jo, Suwon-si (KR); Sungkwang Yang, Suwon-si (KR); Juyoung Yu, Suwon-si (KR); Heonjun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 17/517,288

(22) Filed: Nov. 2, 2021

(65) Prior Publication Data
US 2022/0201391 A1    Jun. 23, 2022

Related U.S. Application Data

(63) Continuation of application No. PCT/KR2021/014431, filed on Oct. 18, 2021.

(30) Foreign Application Priority Data

Dec. 22, 2020  (KR) .................. 10-2020-0180466

(51) Int. Cl.
*H04R 1/02*     (2006.01)
*H04R 3/00*     (2006.01)
(Continued)

(52) U.S. Cl.
CPC ............... *H04R 3/00* (2013.01); *G01V 3/081* (2013.01); *G02B 27/0176* (2013.01);
(Continued)

(58) Field of Classification Search
CPC . H04R 1/00; H04R 1/02; H04R 1/023; H04R 1/028; H04R 1/086; H04R 1/10;
(Continued)

(56) References Cited

U.S. PATENT DOCUMENTS

| | | | | |
|---|---|---|---|---|
| 11,322,959 | B1* | 5/2022 | Ardisana, II | .......... G06F 1/1632 |
| 2003/0085137 | A1* | 5/2003 | Chao | ...................... A45C 11/04 |
| | | | | 206/5 |

(Continued)

FOREIGN PATENT DOCUMENTS

| CN | 111568013 A | 8/2020 |
|---|---|---|
| KR | 10-1996-0040076 A | 11/1996 |
| KR | 10-2016-0019689 A | 2/2016 |

OTHER PUBLICATIONS

International Search Report and Written Opinion (PCT/ISA/210 and PCT/ISA/237) dated Jan. 17, 2022 issued by the International Searching Authority in International Application No. PCT/KR2021/014431.

*Primary Examiner* — Thang V Tran
(74) *Attorney, Agent, or Firm* — Sughrue Mion, PLLC

(57) ABSTRACT

There is provided a case which accommodates an electronic device including a speaker, and a microphone. The case may incudes a first body, an accommodating part having a shape corresponding to a shape of the electronic device a second body provided on the first body so as to open or close the accommodating part, an internal speaker hole formed through the accommodating part, an external speaker hole formed through the first body, a speaker conduit formed in at least one of the first body and the accommodating part so as to connect the internal speaker hole and the external speaker hole, an internal microphone hole facing the microphone an external microphone hole formed through the second body, and a microphone conduit formed through the second body to connect the internal microphone hole and the external microphone hole.

20 Claims, 16 Drawing Sheets

(51) Int. Cl.
    *G02B 27/01* (2006.01)
    *G02C 11/00* (2006.01)
    *H04R 1/34* (2006.01)
    *G01V 3/08* (2006.01)
    *H04R 1/08* (2006.01)

(52) U.S. Cl.
    CPC ............. *G02C 11/10* (2013.01); *H04R 1/023* (2013.01); *H04R 1/028* (2013.01); *H04R 1/086* (2013.01); *H04R 1/342* (2013.01); *H04R 1/345* (2013.01); *G02B 2027/0178* (2013.01); *H04R 2430/01* (2013.01); *H04R 2499/15* (2013.01)

(58) Field of Classification Search
    CPC ...... H04R 1/1041; H04R 1/1075; H04R 1/28; H04R 1/2853; H04R 1/342; H04R 1/345; H04R 3/00; H04R 3/12; H04R 5/00; H04R 5/04; H04R 29/00; H04R 29/001; H04R 29/004; H04R 2430/01; H04R 2499/15; G06F 1/16; G06F 1/163; G06F 1/1628; G06F 1/1656; G06F 1/1688; G06F 3/013; G06F 3/016; G06F 3/017; G06F 3/011; G06F 3/012; G02B 27/017; G02B 27/01; G02B 27/0172; G02B 27/0093; G02B 27/0176; G02B 2027/0178; H04N 13/383; H04N 13/398; H04N 13/344; H04N 13/176; H04N 13/366; G01V 3/081; G02C 11/10

See application file for complete search history.

(56) References Cited

U.S. PATENT DOCUMENTS

| | | | | |
|---|---|---|---|---|
| 2008/0083627 | A1* | 4/2008 | Hamm | A45C 11/04 206/5 |
| 2009/0114550 | A1* | 5/2009 | Ying | A45C 15/00 206/5 |
| 2010/0200456 | A1* | 8/2010 | Parkinson | G06F 1/1626 156/60 |
| 2012/0212398 | A1* | 8/2012 | Border | H04R 1/1041 345/8 |
| 2012/0327615 | A1* | 12/2012 | Waters | G06F 1/1628 361/752 |
| 2014/0305814 | A1 | 10/2014 | Santarelli | |
| 2016/0050305 | A1 | 2/2016 | Lee et al. | |
| 2016/0166027 | A1 | 6/2016 | Godart | |
| 2018/0090958 | A1 | 3/2018 | Steger et al. | |
| 2019/0173294 | A1 | 6/2019 | Paulson | |
| 2019/0272800 | A1 | 9/2019 | Tao et al. | |
| 2020/0383441 | A1 | 12/2020 | Kan et al. | |

\* cited by examiner

[c]

AUGMENTED REALITY WEARABLE ELECTRONIC DEVICE AND CASE

CROSS-REFERENCE TO RELATED APPLICATION

This application is a by-pass continuation application of International PCT Application No. PCT/KR2021/014431 filed Oct. 18, 2021, which is based on and claims priority under 35 U.S.C. § 119 to Korean Patent Application No. 10-2020-0180466, filed on Dec. 22, 2020, in the Korean Intellectual Property Office, the disclosure of which is incorporated by reference herein in its entirety.

BACKGROUND

1. Field

Various example embodiments disclosed herein relate to a wearable electronic device and a case for accommodating the electronic device.

2. Description of Related Art

Augmented reality (AR) technology is a technology, which combines visual elements generated through computer graphic processing with actual real world elements in a surrounding environment of a user. For example, the AR technology may be used to display a virtual object including information regarding an object existing in the real world together with the real world object.

The AR may be implemented through various devices. For example, the AR may be implemented through a wearable electronic device such as an eyeglass-type wearable electronic device or a head mounted display (HMD).

In order to implement the AR through the eyeglass-type wearable electronic device, virtual objects may be displayed on the eyeglass lenses. Images may be displayed on the eyeglass lenses by projecting light onto the lenses. For example, a projector having a very small size (for example, a micro projector or a pico projector) may be used. Examples of such a projector may include a laser scanning display (LSD), a digital micro-mirror display (DMD), or a liquid crystal on silicon (LCoS). In addition, a transparent display may be used to display virtual objects on lenses.

SUMMARY

A wearable electronic device may include various devices or components for performing an audio function. For example, the wearable electronic device may include a microphone and a speaker.

Meanwhile, a case for accommodating a wearable electronic device may be fabricated solely in view of accommodation of the electronic device. There is a problem in that, once an electronic device is accommodated in a case, the audio function of the electronic device cannot be utilized at all.

According to one or more aspect of the disclosure, there are provided various utilization examples regarding a case configured such that, even when an electronic device is accommodated in the case, the audio function of the electronic device can be utilized, and the electronic device accommodated in the case.

According to an aspect of the disclosure, there is provided a case configured to accommodate an electronic device, which includes a speaker, a microphone, and a first support part and a second support part rotatably connected to a body part, the case including: a first body; an accommodating part provided in the first body and formed to have a first shape corresponding to a second shape of the electronic device, the accommodating part configured to accommodate the electronic device; a second body provided on the first body and configured to open or close the accommodating part; an internal speaker hole formed through the accommodating part at a first portion of the accommodating part facing the speaker of the electronic device while the electronic device is accommodated in the accommodating part; an external speaker hole formed through the first body; a speaker conduit formed in at least one of the accommodating part or the first body, the speaker conduit configured to connect the internal speaker hole and the external speaker hole; an internal microphone hole formed at a second portion facing the microphone of the electronic device while the electronic device is accommodated in the accommodating part; an external microphone hole formed through the second body; and a microphone conduit formed through the second body, the microphone conduit configured to connect the internal microphone hole and the external microphone hole.

According to another aspect of the disclosure, there is provided an electronic device including: a body part; a transparent member supported by the body part; a first support part and a second support part which are rotatably connected to the body part; a display configured to display information using the transparent member; a microphone provided in the body part; a speaker provided in at least one of the first support part and the second support part; a connection part provided in at least one of the body part, the first support part, and the second support part, the connection part configured to perform a connection with an external device; and processor operatively connected with the display, the microphone, the speaker, and the connection part, wherein the processor is configured to: identify whether the external device being in contact with the connection part is a case, based on a signal applied through the connection part, and perform switching from a first mode to a second mode, based on a result of the identification that the external device is the case.

According to various example embodiments of the disclosure, even when an electronic device is accommodated in a case, the audio function of the electronic device can be utilized. For example, an audio function through a microphone and a speaker may be provided even when an electronic device is accommodated in a case. In addition, the electronic device accommodated in the case may process information and perform various functions.

BRIEF DESCRIPTION OF THE DRAWINGS

In regard to the description of drawings, the same or like reference numerals may be used to designate the same or like elements.

DETAILED DESCRIPTION

Figure 1:
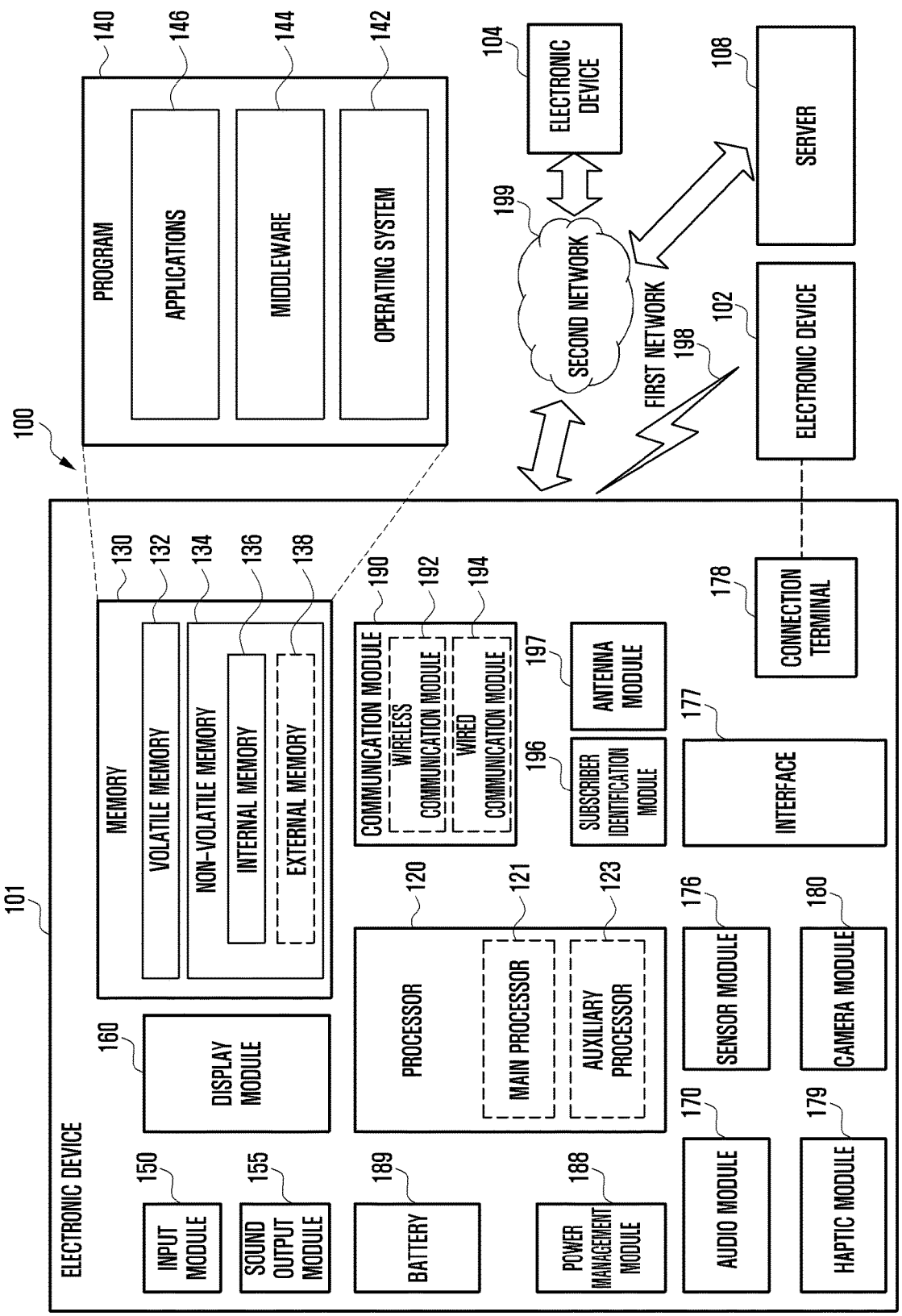
FIG. 1 is a block diagram of an electronic device in a network environment, according to various example embodiments.

It should be appreciated that various example embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
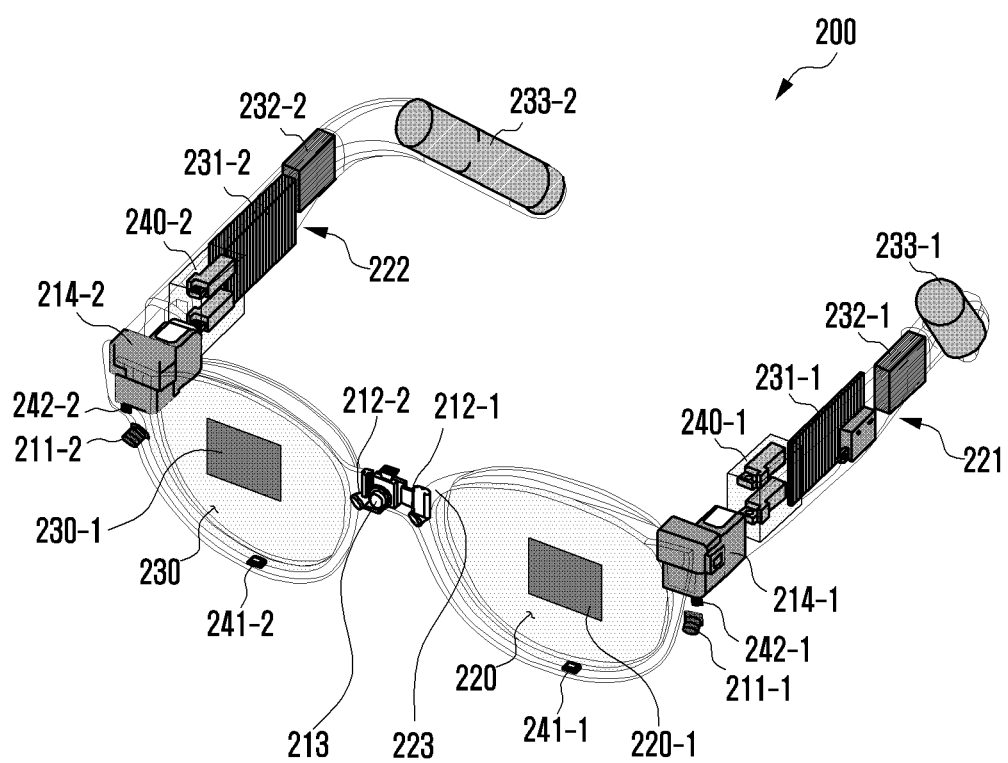
FIG. 2 illustrates a configuration of an electronic device including a plurality of cameras according to various example embodiments.

FIG. 2 illustrates a configuration of an electronic device 200 including a plurality of cameras according to various example embodiments of the disclosure. According to an example embodiment, the electronic device 200 may be the electronic device 101 of FIG. 1.

According to various example embodiments, an electronic device 200 may be an electronic device 200 manufactured to be worn around a user's head section. For example, the electronic device 200 may be configured as at least one of glasses, goggles, a helmet, or a hat, but the disclosure is not limited thereto. For instance, according to another example embodiment, the electronic device 200 may be configured to be worn on a portion of a user's body different from the head section. According to yet another example embodiment, the electronic device 200 may be a device different from a wearable device worn by a user. According to an example embodiment, the electronic device 200 may include a plurality of transparent members, which correspond to a user's eyes. For instance, the plurality of transparent members may include a first transparent member 220 and/or a second transparent member 230 corresponding to a user's left eye and/or right eye), respectively.

The electronic device 200 may provide the user with an image related to an augmented reality (AR) service. According to an example embodiment, the electronic device 200 may enable at least one virtual object to be superimposed on the reality perceived by the user through the first transparent member 220 and/or the second transparent member 230 of the electronic device, by projecting or displaying a virtual object on the first transparent member 220 and/or the second transparent member 230.

Referring to FIG. 2, the electronic device 200 according to an example embodiment may include: a body part 223, a first support part 221 and a second support part 222, a first hinge part 240-1 and a second hinge part 240-2.

According to various example embodiments, the body part 223 may be operatively connected to the support parts 221 and 222 through the hinge parts 240-1 and 240-2. The body part 223 may include a portion formed to be at least partially placed on the user's nose.

According to various example embodiments, the support parts 221 and 222 may include support members formed to be placed on the user's ears. For example, the first support part 221 may be placed on the user's left ear and the second support part 222 may be placed on the user's right ear.

According to various example embodiments, a first hinge part 240-1 may connect the first support part 221 and the body part 223 such that the first support part 221 can rotate with respect to the body part 223. The second hinge part 240-2 may connect the second support part 222 and the body part 223 such that the second support part 222 can rotate with respect to the body part 223. For instance, the first support part 221 may rotate towards the body part 223 or away from the body part 223, and the second support part 222 may rotate towards the body part 223 or away from the body part 223. According to another example embodiment, the hinge parts 240-1 and 240-2 of the electronic device 200 may be omitted. For example, the body part 223 and the support parts 221 and 222 may be directly connected to each other.

According to various example embodiments, the body part 223 may include: at least one transparent member, at least one display module, at least one camera module, and at least one microphone. The body part 223 may include: at least one transparent member (e.g., a first transparent member 220 and a second transparent member 230); at least one display module (e.g., a first display module 214-1 and a second display module 214-2); at least one camera module (e.g., a front photographing camera module 213, an eye tracking camera module (e.g., a first eye tracking camera module 212-1 and a second eye tracking camera module 212-2), and a gesture camera module (e.g., a first gesture camera module 211-1 and a second gesture camera module 211-2)); and at least one microphone (e.g., a first microphone 241-1 and a second microphone 241-2).

According to an example embodiment of the electronic device 200 illustrated in FIG. 2, light generated by the display modules 214-1 and 214-2 is projected onto the transparent members 220 and 230 so as to display information. For example, light generated by the first display module 214-1 may be projected onto the first transparent member 220, and light generated by the second display module 214-2 may be projected onto the second transparent member 230. As light capable of displaying a virtual object is projected onto the transparent members 220 and 230, and since at least a part of the transparent member being formed of a transparent material, the user can perceive real world objects on which a virtual object is superimposed. In this case, the display module 160 described in FIG. 1 may be understood to include the display modules 214-1 and 214-2 and the transparent members 220 and 230 in regard to the electronic device 200 illustrated in FIG. 2. The electronic device 200 described in the disclosure is not limited to displaying information through only the method described above. A display module which may be included in the electronic device 200 may be changed to a display module including various information display methods. For example, when a display panel including a transparent light-emitting element is embedded in the transparent members 220 and 230 themselves, information can be displayed without any separate display module (e.g., the first display module 214-1 and the second display module 214-2). In this case, the display module 160 described in FIG. 1 may indicate the transparent members 220 and 230 and display panels included in the transparent members 220 and 230.

According to various example embodiments, a virtual object output through the display modules 214-1 and 214-2 may include information related to an application program executed in the electronic device 200 and/or information related to an external object positioned in the actual space perceived by a user through the transparent members 220 and 230. The external object may include an object existing in the actual space. Hereinafter, the actual space perceived by the user through the transparent members 220 and 230 is referred to as a region of the user's field of view (FoV). For example, the electronic device 200 may identify an external object included in at least a portion of a region that is determined to be the user's field of view (FoV) in image information related to the actual space, which is acquired through the camera module (e.g., the photographing camera module 213) of the electronic device 200. The electronic device 200 may output a virtual object related to the identified external object through the display modules 214-1 and 214-2.

According to various example embodiments, the electronic device 200 may display image information related to the actual space, which is acquired through the photographing camera module 213 of the electronic device 200, together with a virtual object related to an augmented reality service. According to an example embodiment, the electronic device 200 may display a virtual object, based on the display modules (e.g., the first display module 214-1 corresponding to the user's left eye and/or the second display module 214-2 corresponding to the user's right eye) disposed to correspond to the user's both eyes. According to an example embodiment, the electronic device 200 may display a virtual object, based on preconfigured configuration information (e.g., resolution, a frame rate, brightness, and/or a display region).

According to various example embodiments, the transparent members 220 and 230 may include a light-collecting lens and/or waveguide tubes (e.g., a first waveguide tube 220-1 and/or a second waveguide tube 230-1). For example, the first waveguide tube 220-1 may be partially positioned in the first transparent member 220, and the second waveguide tube 230-1 may be partially positioned in the second transparent member 230. Light emitted from the display modules 214-1 and 214-2 may be incident onto surfaces of the transparent members 220 and 230. The light incident onto the surfaces of the transparent members 220 and 230 may be transferred to the user through the waveguide tubes 220-1 and 230-1 positioned in the transparent members 220 and 230. The waveguide tubes 220-1 and 230-1 may be manufactured of glass, plastic, or a polymer, and may include a nano pattern formed on the internal or external surface thereof. For example, the nano pattern may have a grating structure having a polygonal shape or a curved shape. According to an example embodiment, the light incident onto the surfaces of the transparent members 220 and 230 may be spread or reflected inside the waveguide tubes 220-1 and 230-1 by the nano pattern thereof so as to be transferred to the user. According to an example embodiment, the waveguide tubes 220-1 and 230-1 may include at least one diffractive element (e.g., a diffractive optical element (DOE) and a holographic optical element (HOE)) or at least one reflective element (e.g., a reflective mirror). According to an example embodiment, the waveguide tubes 220-1 and 230-1 may guide the light emitted from the display modules 214-1 and 214-2 to the user's eyes by using the at least one diffractive element or reflective element.

According to various example embodiments, the electronic device 200 may include: a photographing camera module 213 (e.g., an RGB camera module) for photographing an image corresponding to a user's field of view (FoV) and/or measuring a distance to an object; eye tracking camera modules 212-1 and 212-2 for identifying a direction of the user's gaze; and/or gesture camera modules 211-1 and 211-2 for recognizing a predetermined space. For example, the photographing camera module 213 may photograph the front direction of the electronic device 200, and the eye tracking camera modules 212-1 and 212-2 may photograph a direction opposite the photographing direction of the photographing camera module 213. For example, a first eye tracking camera module 212-1 may partially photograph the user's left eye, and a second eye tracking camera module 212-2 may partially photograph the user's right eye. According to an example embodiment, the photographing camera module 213 may include a camera module having a high resolution, such as a high resolution (HR) camera module and/or a photo video (PV) camera module. According to an example embodiment, the eye tracking camera modules 212-1 and 212-2 may detect the user's pupils and thus track the user's gaze direction. The tracked gaze direction can be used to enable the center of a virtual image including a virtual object to move according to the gaze direction. According to an example embodiment, the gesture camera modules 211-1 and 211-2 may sense the user's gesture within a preconfigured distance (e.g., a predetermined space) and/or a predetermined space. The gesture camera modules 211-1 and 211-2 may include camera modules, each including a global shutter (GS). For example, in order to detect and track a quick hand motion and/or a minute motion such as a finger motion, the gesture camera modules 211-1 and 211-2 may be a camera module including a GS, the camera module capable of reducing a rolling shutter (RS) phenomenon.

According to various example embodiments, the electronic device 200 may sense a user's eyes corresponding to a dominant eye and/or a non-dominant eye among the user's left eye and/or the user's right eye by using at least one camera module 211-1, 211-2, 212-1, 212-2, or 213. For example, the electronic device 200 may sense a user's eyes corresponding to a dominant eye and/or a non-dominant eye, based on the user's gaze direction with respect to an external object or a virtual object.

The number and the position of at least one camera module (e.g., the photographing camera module 213, the eye tracking camera modules 212-1 and 212-2, and/or the gesture camera modules 211-1 and 211-2) included in the electronic device 200 illustrated in FIG. 2 may not be limited. For example, the number and the position of at least one camera module (e.g., the photographing camera module 213, the eye tracking camera modules 212-1 and 212-2, and/or the gesture camera modules 211-1 and 211-2) may be variously changed based on the form (e.g., a shape or a size) of the electronic device 200.

According to various example embodiments, the electronic device 200 may include at least one illumination LED (e.g., a first light-emitting device 242-1 and a second light-emitting device 242-2) for improving the accuracy of at least one camera module (e.g., the photographing camera module 213, the eye tracking camera modules 212-1 and 212-2, and/or the gesture camera modules 211-1 and 211-2). For example, the first light-emitting device 242-1 may be disposed at a portion corresponding to a user's left eye, and the second light-emitting device 242-2 may be disposed at a portion corresponding to the user's right eye. In an example embodiment, the light-emitting devices 242-1 and 242-2 may be used as an auxiliary means for improving the accuracy when the user's pupils are photographed by the eye tracking camera modules 212-1 and 212-2, and may include an IR LED which generates light having an infrared wavelength. In addition, the light-emitting devices 242-1 and 242-2 may be used as an auxiliary means when it is not easy to detect a subject to be photographed due to a dark environment, mixing of several light sources, and reflected light while the user's gesture is photographed by the gesture camera modules 211-1 and 211-2.

According to various example embodiments, the electronic device 200 may include microphones (e.g., a first microphone 241-1 and a second microphone 241-2) for receiving a user's voice and surrounding sound. For example, the microphones 241-1 and 241-2 may be elements included in the audio module 170 of FIG. 1.

According to various example embodiments, each of a first support part 221 and/or a second support part 222 may include: a printed circuit board (PCB) (e.g., a first printed circuit board 231-1 or a second printed circuit board 231-2); a speaker (e.g., a first speaker 232-1 or a second speaker 232-2); and/or a battery (e.g., a first battery 233-1 or a second battery 233-2).

According to various example embodiments, the speakers 232-1 and 232-2 may include: a first speaker 232-1 for transferring an audio signal to a user's left ear; and a second speaker 232-2 for transferring an audio signal to the user's right ear. The speakers 232-1 and 232-2 may be elements included in the audio module 170 of FIG. 1.

According to various example embodiments, the electronic device 200 may include a plurality of batteries 233-1 and 233-2, and may supply electric power to the printed circuit boards 231-1 and 231-2 through a power management module (e.g., the power management module 188 of FIG. 1). For example, the plurality of batteries 233-1 and 233-2 may be electrically connected to the power management module (e.g., the power management module 188 of FIG. 1).

The electronic device 200 is described above as a device for displaying an augmented reality, but the electronic device 200 may be a device for displaying a virtual reality (VR). In this case, the transparent members 220 and 230 may be formed of an opaque material such that a user cannot perceive the actual space through the transparent members 220 and 230. In addition, the transparent members 220 and 230 may function as the display module 160. For example, the transparent members 220 and 230 may include display panels for displaying information.

Hereinafter, the same reference numerals are used to designate the same or like elements.

Figure 3A:
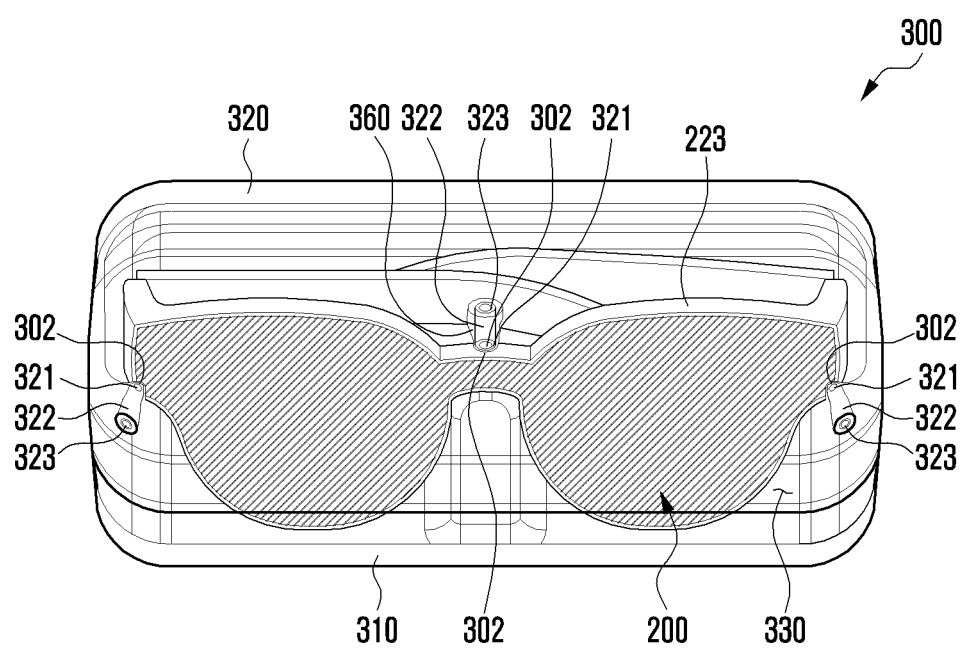
FIG. 3A is a front perspective view in a state where an electronic device is accommodated in a case according to various example embodiments of the disclosure.
Figure 3B:
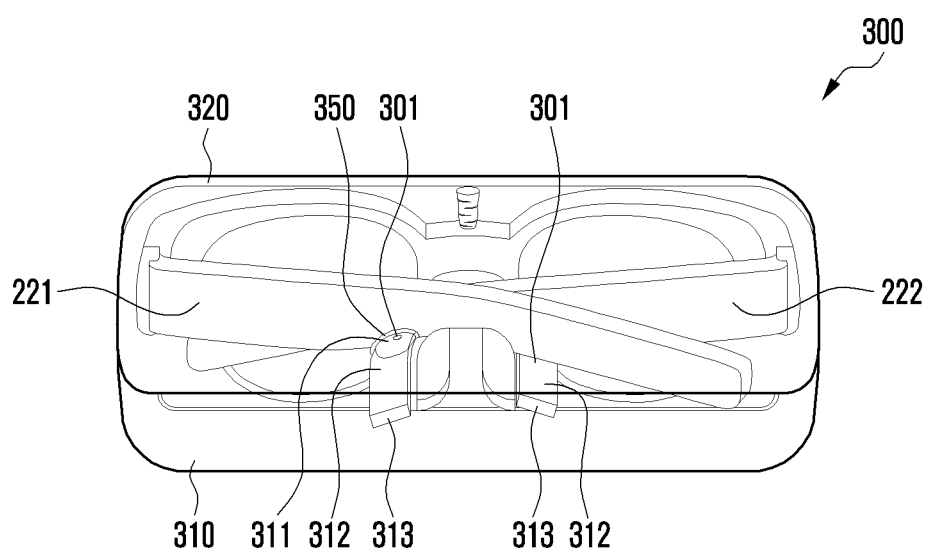
FIG. 3B is a rear perspective view in a state where an electronic device is accommodated in a case according to various example embodiments of the disclosure.
Figure 3C:
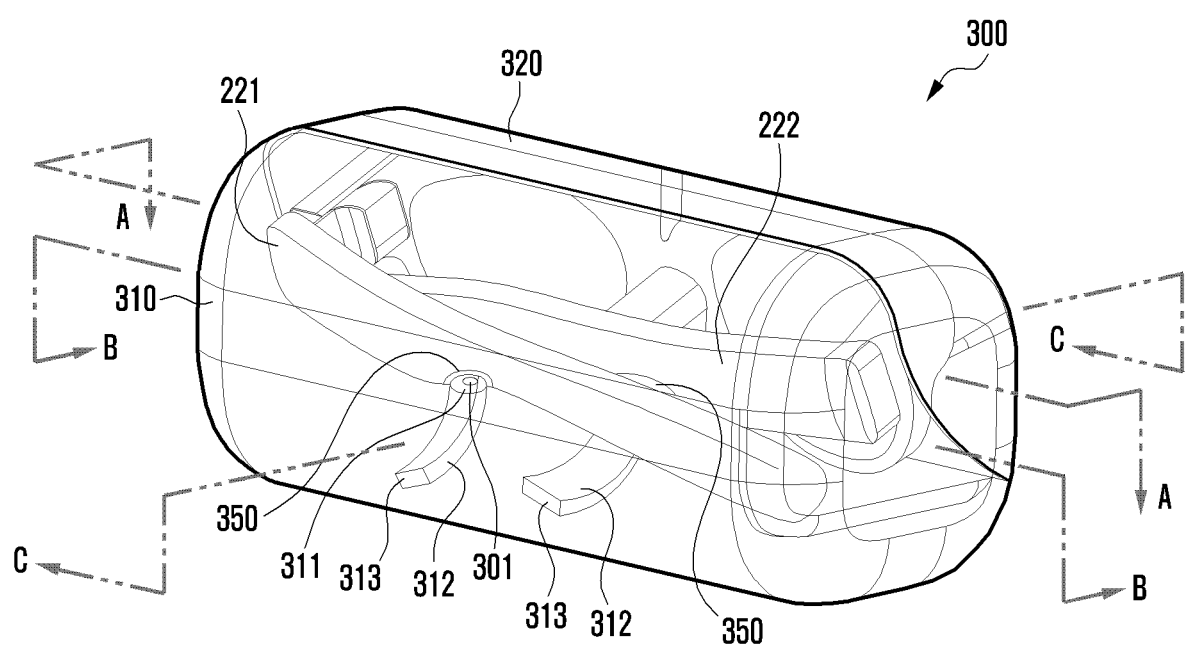
FIG. 3C is a rear-side lateral perspective view in a state where an electronic device is accommodated in a case according to various example embodiments of the disclosure.
Figure 3D:
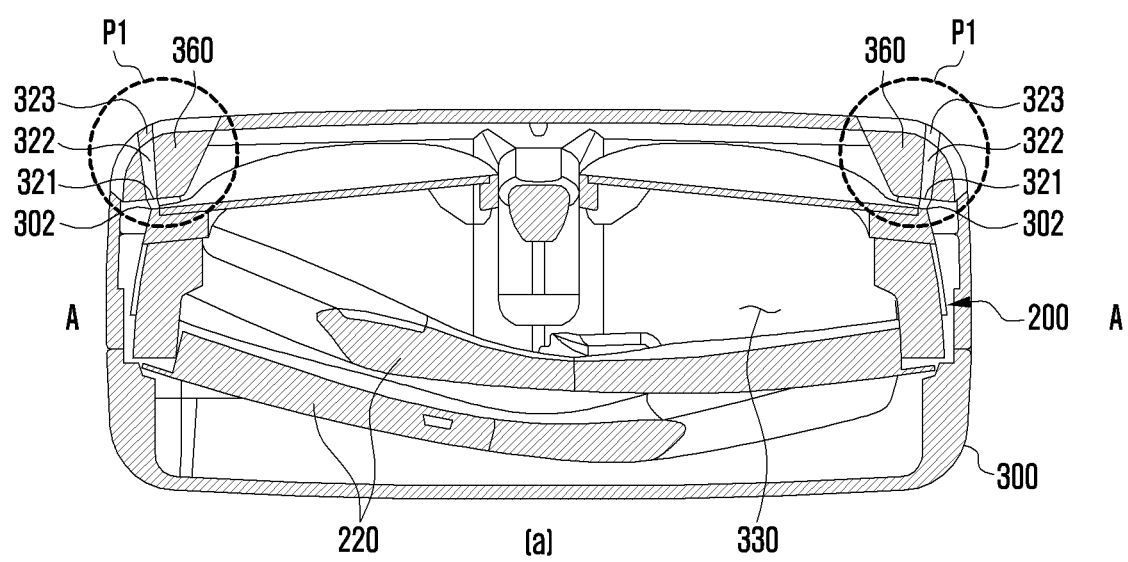
FIGS. 3D to 3F are cross-sectional views for describing a conduit structure connected to a speaker and a microphone of an electronic device in a state where the electronic device is accommodated in a case according to various example embodiments of the disclosure.
Figure 3E:
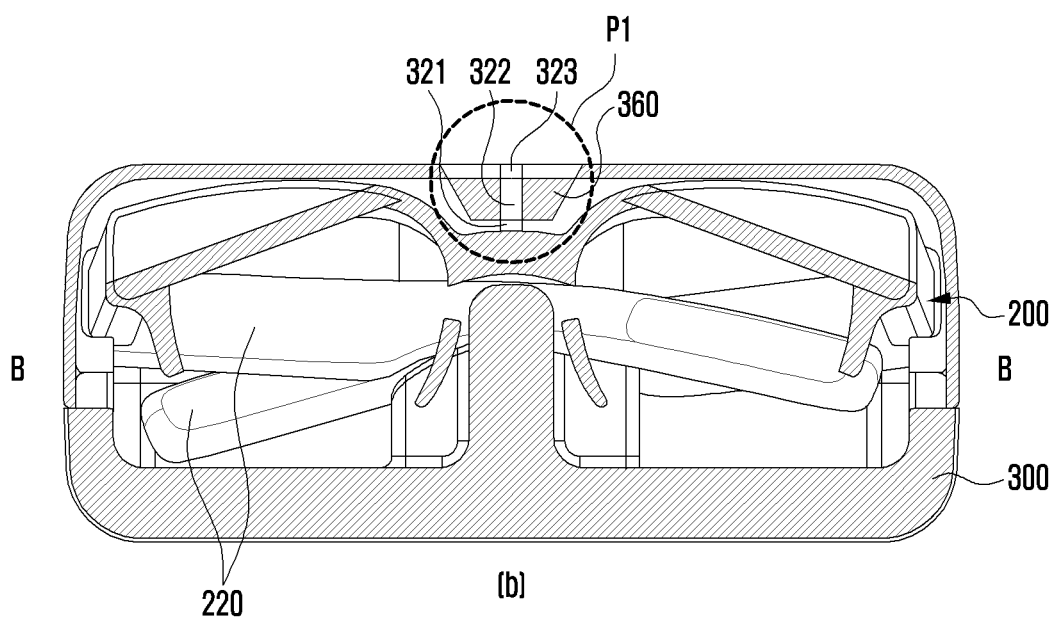
Figure 3F:
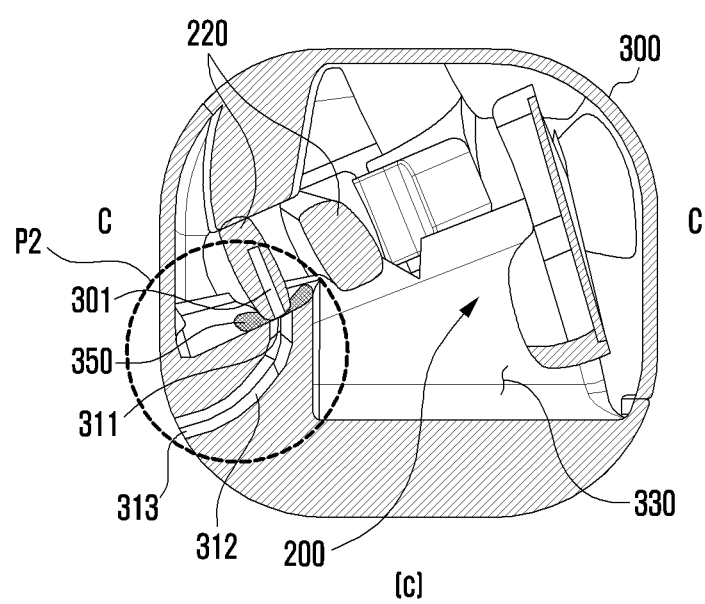

FIG. 3A is a front perspective view in a state where an electronic device is accommodated in a case according to various example embodiments of the disclosure. FIG. 3B is a rear perspective view in a state where an electronic device is accommodated in a case according to various example embodiments of the disclosure. FIG. 3C is a rear-side lateral perspective view in a state where an electronic device is accommodated in a case according to various example embodiments of the disclosure. FIGS. 3D-3F are cross-sectional views for describing a conduit structure connected to a speaker and a microphone of an electronic device in a state where the electronic device is accommodated in a case according to various example embodiments of the disclosure.

According to various example embodiments, a case 300 described herein may accommodate the electronic device 200 described in FIG. 2. An electronic device 200 to be described below may be similar to the electronic device 200 described in FIG. 2, but some elements thereof may be slightly different. For example, an arrangement of a speaker 301 and a microphone 302 included in the electronic device 200 may not be the same as an arrangement of the speakers 232-1 and 232-2 and the microphones 241-1 and 241-2 of the electronic device 200 illustrated in FIG. 2. Hereinafter, the speakers 232-1 and 232-2 of FIG. 2 are referred to as the speaker 301, and the microphones 241-1 and 241-2 of FIG. 2 are referred to as the microphone 302.

Referring to FIGS. 3A to 3C, a case 300 may include a first body 310 and a second body 320. The first body 310 and the second body 320 may be formed of various materials. For example, the first body 310 and the second body 320 may be formed of metal or a synthetic resin material. In an example embodiment, the first body 310 and the second body 320 may be formed of different materials.

According to various example embodiments, an accommodating part 330 may be disposed in the first body 310. According to an example embodiment, accommodating part 330 may be a housing that receives and houses the electronic device 200. According to an example embodiment, The accommodating part 330 may be formed to have a shape corresponding to the folded electronic device 200 so as to accommodate the folded electronic device 200. The electronic device 200 in a folded state may indicate a state where the first support part 221 and the second support part 222 rotate with respect to the body part 223 of the electronic device 200, so that the first support part 221 and the second support part 222 get closer to the body part 223. In an example embodiment, the accommodating part 330 may be formed separately from the first body 310 and be disposed inside the first body 310. At least a part of the accommodating part 330 may be formed of an elastically deformable material. For example, a part of the accommodating part 330 may be formed of an elastically deformable material such as rubber and PORON® material. In another example embodiment, the accommodating part 330 may be integrally formed with the first body 310. In this case, the accommodating part 330 may be formed inside the first body 310. In another example embodiment, a part of the accommodating part 330 may be formed inside the first body 310, and the remaining thereof may be formed separately and then coupled to the part of the accommodating part 330, which is formed inside the first body 310. In addition, the accommodating part 330 may be changed in various shapes capable of accommodating the electronic device 200 within the scope that those skilled in the art can understand.

According to various example embodiments, the second body 320 may be installed to be rotatable with respect to the first body 310. For example, the first body 310 and the second body 320 may be connected to each other by means of a hinge structure. As the second body 320 rotates with respect to the first body 310, the accommodating part 330 disposed inside the first body 310 may be opened (see FIG. 4A) or closed (see FIG. 3A).

According to various example embodiments, the case 300 may include a pressurization part for pressurizing the electronic device 200 accommodated in the accommodating part 330 toward the accommodating part 330 in a closed state. The pressurization part may maintain a state where the electronic device 200 is stably accommodated in the accommodating part 330.

According to various example embodiments, as illustrated in FIG. 3A, the second body 320 may include an element for connecting the microphone 302 of the electronic device 200 to the outside. While the electronic device 200 is accommodated in the case 300, the body part 223 of the electronic device 200 may substantially face the second body 320. The microphone 302 of the electronic device 200 may be disposed in the body part 223 of the electronic device 200. An external sound may be transferred to the microphone 302 of the electronic device 200 through an internal microphone hole 321, an external microphone hole 323, and a microphone conduit 322 which are formed in the second body 320. The number of internal microphone holes 321, the number of external microphone holes 323, and the number of microphone conduits 322 may be changed according to the number of microphones 302 included in the electronic device 200. For example, as illustrated in FIG. 3A, when the number of microphones 302 of the electronic device 200 is three, the number of internal microphone holes 321, the number of external microphone holes 323, and the number of microphone conduits 322 may be three such that an external sound can be transferred to each of the microphones 302 of the electronic device 200. In some cases, the number of internal microphone holes 321, the number of external microphone holes 323, and the number of microphone conduits 322 may be less than the number of microphones 302 of the electronic device 200. In this case, only a few microphones of the electronic device 200 may be connected to the outside.

According to various example embodiments, the internal microphone hole 321 may be an opening formed through a portion of the second body 320, the portion facing the microphone 302 of the electronic device 200 in a state where the electronic device 200 is accommodated in the case 300. The external microphone hole 323 may be an opening formed through the second body 320. The microphone conduit 322 may be a passage formed through the second body 320 such that the internal microphone hole 321 and the external microphone hole 323 can be connected to each other. In an example embodiment, a second elastic member 360 may be disposed around the internal microphone hole 321. When the second body 320 closes the accommodating part 330 of the first body 310 while the electronic device 200 is accommodated in the case 300, a part of the second elastic member 360 may be elastically deformed and thus partially block a sound from leaking through a gap between the internal microphone hole 321 and the microphone of the electronic device 200. The second elastic member 360 may partially seal between the internal microphone hole 321 and the microphone of the electronic device 200 and thus block a phenomenon in which a sound leaks and/or a phenomenon in which a foreign substance introduced from the outside is introduced into the case 300. For example, the second elastic member 360 may be formed of an elastically deformable material such as rubber and PORON.

According to various example embodiments, as illustrated in FIGS. 3B and 3C, the first body 310 may include an element for connecting the speaker 301 of the electronic device 200 to the outside. In an example embodiment, the first body 310 may include an internal speaker hole 311, an external speaker hole 313, and a speaker conduit 312. In a state where the electronic device 200 is accommodated in the case 300, the first support part 221 and the second support part 222 of the electronic device 200 may substantially face the first body 310 and the accommodating part 330. The speaker 301 of the electronic device 200 may be disposed in each of the first support part 221 and the second support part 222 of the electronic device 200. A sound generated by the speaker 301 of the electronic device 200 may be transferred to the outside of the case 300 through the internal speaker hole 311, the external speaker hole 313, and the speaker conduit 312 which are formed in the first body 310 and the accommodating part 330. The number of internal speaker holes 311, the number of external speaker holes 313, and the number of speaker conduits 312 may be changed according to the number of speakers 301 included in the electronic device 200. For example, as illustrated in FIGS. 3B to 3C, when the number of speakers 301 of the electronic device 200 is two, the number of internal speaker holes 311, the number of external speaker holes 313, and the number of speaker conduits 312 may be two such that a sound generated by each of the speakers 301 of the electronic device 200 can be transferred to the outside. In some cases, the number of internal speaker holes 311, the number of external speaker holes 313, and the number of speaker conduits 312 may be less than the number of speakers 301 of the electronic device 200. In this case, only a few speakers of the electronic device 200 may be connected to the outside.

According to various example embodiments, the internal speaker hole 311 may be an opening formed through a portion of the first body 310 and/or the accommodating part 330, the portion facing the speaker 301 of the electronic device 200 in a state where the electronic device 200 is accommodated in the case 300. The external speaker hole 313 may be an opening formed through the first body 310. The speaker conduit 312 may be a passage formed through the first body 310 and the accommodating part 330 such that the internal speaker hole 311 and the external speaker hole 313 can be connected to each other. In an example embodiment, a first elastic member 350 may be disposed around the internal speaker hole 311. When the second body 320 closes the accommodating part 330 of the first body 310 while the electronic device 200 is accommodated in the case 300, a part of the first elastic member 350 may be elastically deformed and thus partially block a sound from leaking through a gap between the internal speaker hole 311 and the speaker 301 of the electronic device 200. The first elastic member 350 may partially seal between the internal speaker hole 311 and the speaker 301 of the electronic device 200 and thus block a phenomenon in which a sound leaks and/or a phenomenon in which a foreign substance introduced from the outside is introduced into the case 300. For example, the first elastic member 350 may be formed of an elastically deformable material such as rubber or PORON® material.

According to various example embodiments, a terminal part, which may be in contact with a connection part (e.g., the connection terminal 178 of FIG. 1) of the electronic device 200 may be provided in the accommodating part 330. The terminal part may be a device capable of transferring an electrical signal to the connection part of the electronic device 200. For example, the terminal part may be a pogo-pin. In a state where the electronic device 200 is accommodated in the accommodating part 330, the connection part of the electronic device 200 and the accommodating part 330 of the case 300 may be in contact with each other.

According to various example embodiments, the case 300 may include a case battery. The case battery may be electrically connected to the terminal part. In a state where the electronic device 200 is accommodated in the case 300, electric power of the case battery may be supplied to the electronic device 200 through the terminal part.

FIG. 3D is a cross-sectional view, taken along line A-A, of the case 300 and the electronic device 200 illustrated in FIG. 3C, FIG. 3E is a cross-sectional view, taken along line B-B, of the case 300 and the electronic device 200 illustrated in FIG. 3C, and FIG. 3F is a cross-sectional view, taken along line C-C, of the case 300 and the electronic device 200 illustrated in FIG. 3C.

According to various example embodiments, the microphone 302 of the electronic device 200 may be disposed in the electronic device 200 at various positions thereof. For example, as illustrated in FIGS. 3D and 3E, the microphones 302 may be disposed at each of the center and both lateral sides of the electronic device 200. In a state where the electronic device 200 is accommodated in the accommodating part 330 of the case 300, the microphone 302 may be positioned to be adjacent to the internal microphone hole 321. An external sound may be transferred to the microphone 302 through the external microphone hole 323, the microphone conduit 322, and the internal microphone hole 321.

According to various example embodiments, the speaker 301 of the electronic device 200 may be disposed in the electronic device 200 at various positions thereof. For example, as illustrated in FIG. 3F, the speaker 301 may be disposed in each of the support parts 221, 222 of the electronic device 200. In a state where the electronic device 200 is accommodated in the accommodating part of the case 300, the speaker 301 may be positioned to be adjacent to the internal speaker hole 311. A sound output from the speaker 301 may be transferred to the outside of the case 300 through the internal speaker hole 311, the speaker conduit 312, and the external speaker hole 313.

According to various example embodiments, the first elastic member 350 may be disposed around the internal speaker hole 311. In a state where the electronic device 200 is accommodated in the case 300, the first elastic member 350 may be elastically deformed by the support part 220 of the electronic device 200, and prevent the sound output from the speaker 301 from diffusing into the case 300.

According to various example embodiments, the second elastic member 360 may be disposed around the internal microphone hole 321. In a state where the electronic device 200 is accommodated in the case 300, the second elastic member 360 may be elastically deformed by the electronic device 200, and prevent the sound transferred to the microphone 302 from diffusing into the case 300.

Figure 4A:
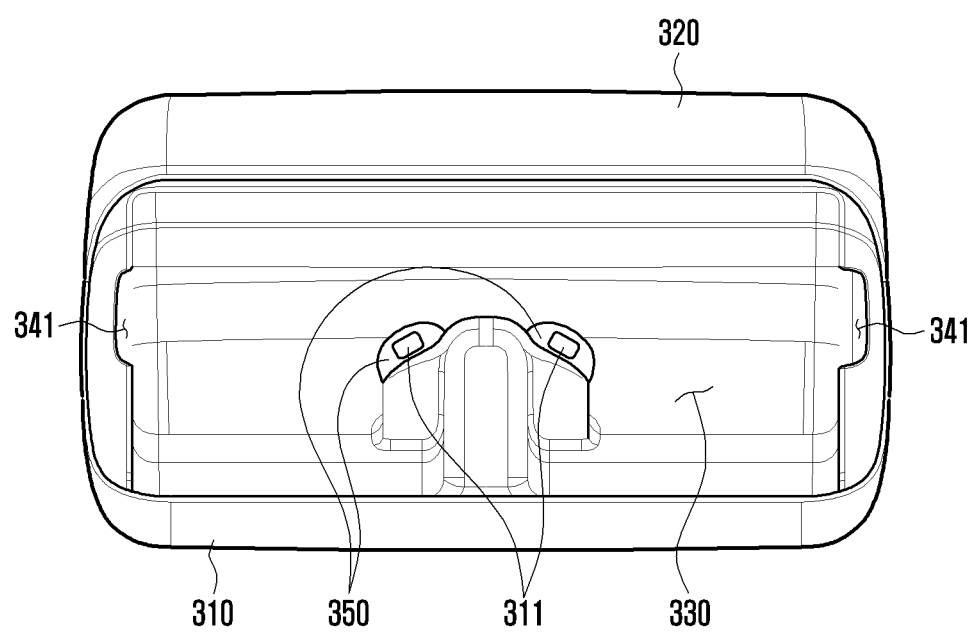
FIG. 4A illustrates a first body part in a state where a case is opened according to various example embodiments of the disclosure.
Figure 4B:
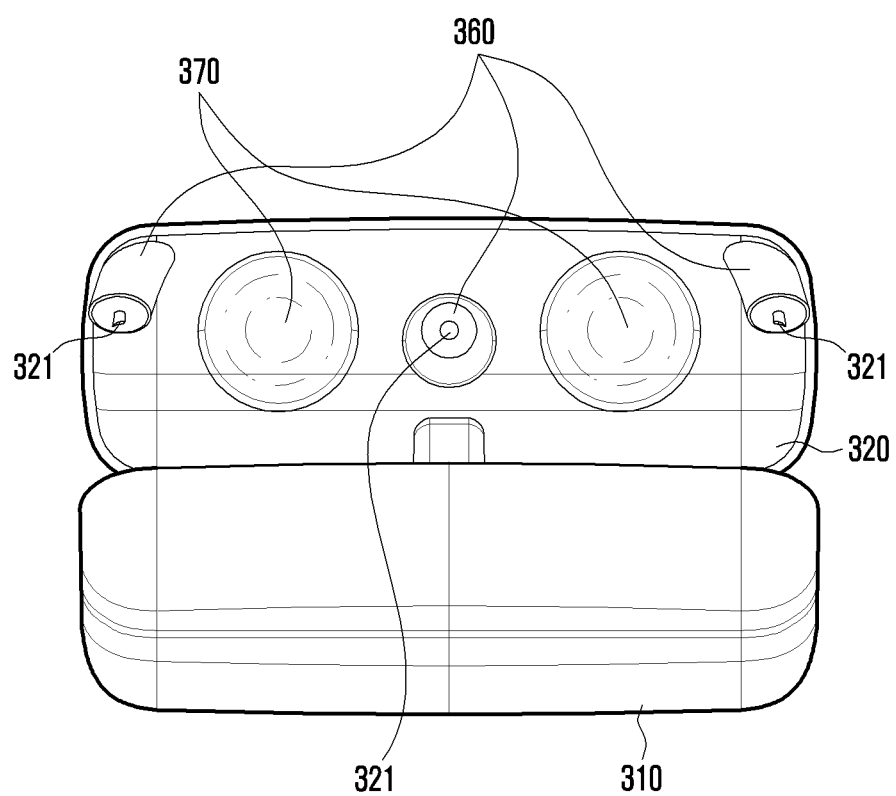
FIG. 4B illustrates a second body part in a state where a case is closed according to various example embodiments of the disclosure.
Figure 4C:
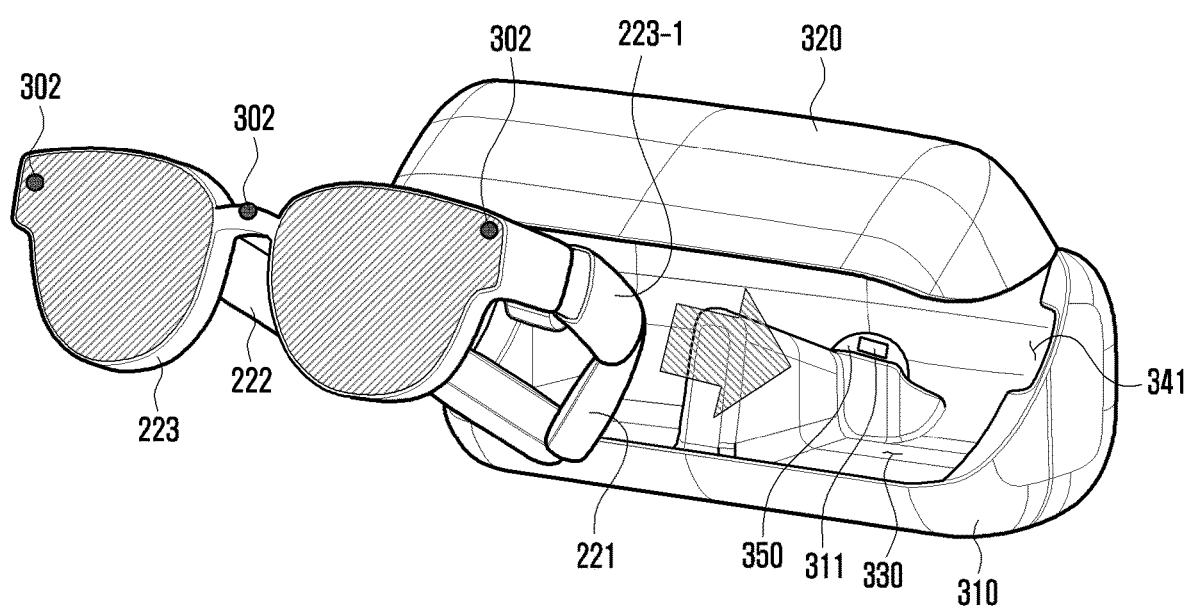
FIG. 4C illustrates a scene where an electronic device is accommodated in a case according to various example embodiments of the disclosure.

FIG. 4A illustrates a first body part in a state where a case is open according to various example embodiments of the disclosure. FIG. 4B illustrates a second body part in a state where a case is closed according to various example embodiments of the disclosure. FIG. 4C illustrates a scene where an electronic device is accommodated in a case according to various example embodiments of the disclosure.

According to various example embodiments, the accommodating part 330 formed in the first body 310 may be formed to have a shape corresponding to the folded electronic device 200 such that the folded electronic device 200 can be fixed in the accommodating part 330.

According to various example embodiments, the internal speaker hole 311 and the first elastic member 350 disposed around the internal speaker hole 311 may be disposed in the accommodating part 330 of the first body 310. The internal speaker hole 311 may be in contact with a part of each of the first support part 221 and the second support part 222 of the electronic device 200 in a state where the electronic device 200 is accommodated in the accommodating part 330. The speaker 301 of the electronic device 200 may be disposed at a portion where the internal speaker hole 311 is in contact with each of the first support part 221 and the second support part 222.

According to various example embodiments, the electronic device 200 may be folded in two methods. A first method is a method in which the first support part 221 of the electronic device 200 is folded first, and the second support part 222 is folded to overlap the first support part 221. A second method is a method in which the second support part 222 of the electronic device 200 is folded first, and the first support part 221 is folded to overlap the second support part 222. According to these two methods, the positions of the internal speaker hole 311 and the speaker 301 of the electronic device 200 may be changed. For example, when the internal speaker hole 311 is formed at the same position in the first body 310 and the electronic device 200 having been folded in the first method is accommodated, the speaker 301 disposed in the second support part 222 may be disposed to be closer to the internal speaker hole 311 than the speaker 301 disposed in the first support part 221. When the electronic device 200 having been folded in the second method is accommodated, the speaker 301 disposed in the first support part 221 may be disposed to be closer to the internal speaker hole 311 than the speaker 301 disposed in the second support part 222. In an example embodiment, when the electronic device 200 having been folded in the first method is accommodated, the internal speaker hole 311 may be positioned at another place. In this case, the accommodating part 330, which enables only the electronic device 200 having been folded in the first method to be normally accommodated in the accommodating part 330, may be used. In addition, when the electronic device 200 having been folded in the second method is accommodated, the internal speaker hole 311 may be positioned at another place. In this case, the accommodating part 330, which enables only the electronic device 200 having been folded in the second method to be normally accommodated in the accommodating part 330, may be used. In another example embodiment, the accommodating part 330, which can accommodate the electronic device 200 no matter how the electronic device is folded, may be used. In this case, in order to cover a position difference of the speaker 301 due to the first method and the second method, a shape of the first elastic member 350 disposed around the internal speaker hole 311 may be adjusted. According to various example embodiments, due to a position difference between the speaker 301 and the speaker hole 311 due to the first method or the second method, the lengths, shapes, and/or directions of the speaker conduit 312 corresponding to the first support part 221 and the speaker conduit 312 corresponding to the second support part 222 may be different from each other.

According to various example embodiments, a guide groove 341 may be formed in the first body 310, the guide groove being configured to guide the electronic device 200 to be rightly accommodated in the accommodating part 330 at a designated position in a designated direction. The guide groove 341 may be a groove formed in a shape corresponding to the lateral shape of the body part 223 of the electronic device 200. As the lateral side of the body part 223 of the electronic device 200 is inserted into the guide groove 341 while the electronic device 200 is accommodated in the case 300, the electronic device 200 may be maintained to be accommodated in the accommodating part 330. In an example embodiment, a guide protrusion 223-1 may be formed on the lateral surface of the body part 223 of the electronic device 200 in a shape corresponding to the guide groove 341. As the guide protrusion 223-1 formed on the body part 223 of the electronic device 200 is inserted into the guide groove 341, the electronic device 200 can be accommodated in the case 300 at a correct position in a correct direction.

According to various example embodiments, a support part 370 may be disposed in the second body 320. The support part 370 may be formed by partially protruding from the inner surface of the second body 320 such that the second body 320 rotates with respect to the first body 310 so as to press the electronic device 200 toward the accommodating part 330 while closing the accommodating part 330. According to another example embodiment, the second body 320 may be coupled to or separated from the first body 310, and, when the second body 320 is coupled to the first body 310, the support part 370 formed by partially protruding from the inner surface of the second body 320 may press the electronic device 200 toward the accommodating part 330. As the support part 370 applies pressure on the electronic device 200 toward the accommodating part 330 in a state where the case 300 is closed, the electronic device 200 cannot move inside the case 300 even through the impact is applied to the case 300.

FIG. 4B illustrates that the support part 370 is disposed in a portion other than a region in which the internal microphone hole 321 is disposed, but the support part 370 may be entirely disposed inside the second body 320. In this case, a part of the internal microphone hole 321 and a part of the microphone conduit 322 which are disposed in the second body 320 may be formed on the support 370.

Figure 5:
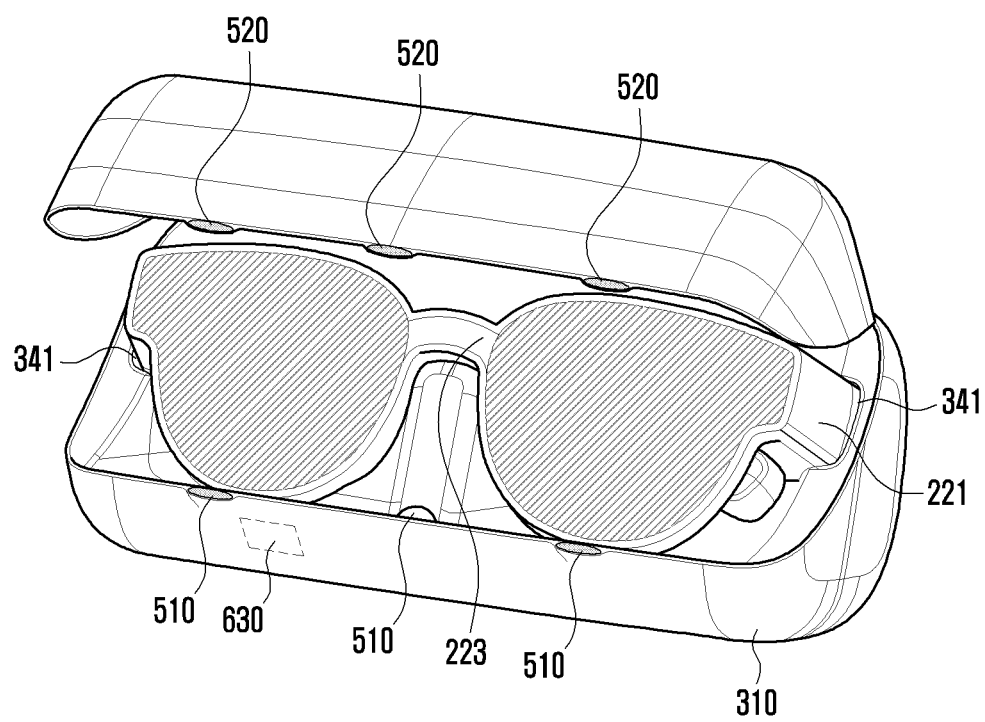
FIG. 5 is a perspective view illustrating a state where an electronic device is accommodated in a case according to various example embodiments of the disclosure.

FIG. 5 is a perspective view illustrating a state where an electronic device is accommodated in a case according to various example embodiments of the disclosure.

According to various example embodiments, a first magnetic member 510 may be disposed on the first body 310 at a portion thereof being in contact with the second body 320. In addition, a second magnetic member 520 may be disposed on the second body 320 at a portion thereof being in contact with the first body 310. The first magnetic member 510 and the second magnetic member 520 may be magnetically coupled to each other. For example, the first magnetic member 510 may be formed of a metallic material having a magnetic property, and the second magnetic member 520 may be a magnet. In another example, the first magnetic member 510 may be a magnet, and the second magnetic member 520 may be formed of a metallic material having a magnetic property. In some cases, both the first magnetic member 510 and the second magnetic member 520 may be a magnet. As the first magnetic member 510 and the second magnetic member 520 are magnetically coupled to each other, the second body 320 may be maintained to close the accommodating part 330 disposed in the first body 310.

According to various example embodiments, a plurality of first magnetic members 510 disposed in the first body 310 and a plurality of second magnetic members 520 disposed in the second body 320 may be provided. For example, as illustrated in FIG. 5, the number of first magnetic members 510 and the number of second magnetic members 520 may be three.

According to various example embodiments, an attachment/detachment sensing sensor 630 capable of sensing whether the case 300 is opened or closed may be disposed in at least one of the first body 310 or the second body 320.

For example, the attachment/detachment sensing sensor 630 may include a Hall sensor capable of sensing a magnetic field change. The attachment/detachment sensing sensor 630 may be disposed in at least one of the first body 310 or the second body 320 at a position adjacent to the first magnetic member 510 and the second magnetic member 520, and thus sense whether the case 300 is opened or closed by sensing a magnetic field change due to a position relation between the first magnetic member 510 and the second magnetic member 520. In an example embodiment, the attachment/detachment sensing sensor 630 may be a sensor which senses a magnetic field change of three axial directions.

According to various example embodiments, the attachment/detachment sensing sensor 630 capable of identifying whether the case 300 is opened or closed may be connected to a terminal part of the case 300. A signal sensed by the attachment/detachment sensing sensor 630 may be transferred to the electronic device 200 through the terminal part.

Figure 6A:
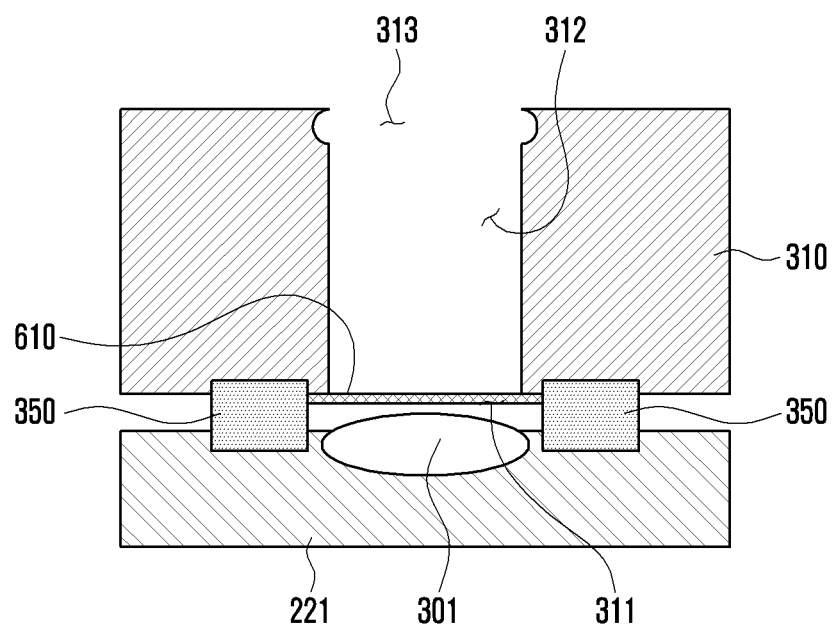
FIG. 6A is a diagram illustrating a structure in which a sound of a speaker of an electronic device can be emitted through a case according to various example embodiments of the disclosure.
Figure 6B:
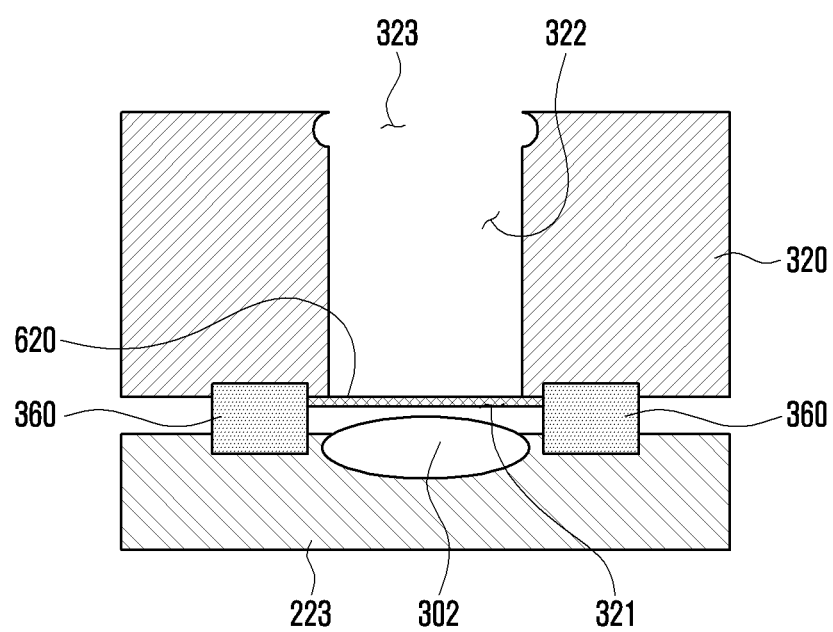
FIG. 6B is a diagram illustrating a structure in which a sound of a microphone of an electronic device can be received through a case according to various example embodiments of the disclosure.

FIG. 6A is a diagram illustrating a structure in which a sound of a speaker of an electronic device can be emitted through a case according to various example embodiments of the disclosure. FIG. 6B is a diagram illustrating a structure in which a sound of a microphone of an electronic device can be received through a case according to various example embodiments of the disclosure. For example, FIG. 6A may be a diagram illustrating a portion P2 (e.g., a portion where the speaker 301 is positioned) of FIG. 3F, and FIG. 6B may be a diagram illustrating a portion P1 (e.g., a portion where the microphone 302 is positioned) of FIGS. 3D-3E.

According to various example embodiments, the speaker 301 of the electronic device 200 may output a sound to the outside of the case 300 through the internal speaker hole 311, the speaker conduit 312, and the external speaker hole 313 which are included in the first body 310 of the case 300. Referring to FIG. 6A, the internal speaker hole 311 may be positioned at a portion facing the speaker 301, and the internal speaker hole 311 may be connected to the external speaker hole 313 through the speaker conduit 312.

According to various example embodiments, the first elastic member 350 may be disposed around the internal speaker hole 311. The first elastic member 350 may partially seal between the internal speaker hole 311 and the speaker of the electronic device 200. As the support part 370 applies the pressure on the electronic device 200 while the case 300 is closed, a part of the first elastic member 350 may be elastically deformed so as to be brought in close contact with the periphery of the speaker 301 of the electronic device 200.

According to various example embodiments, a speaker mesh 610 may be provided in at least one of the internal speaker hole 311 and the external speaker hole 313. The speaker mesh 610 is formed in a mesh structure so as to transmit a sound, and may also block the inflow of an external foreign substance into the case 300. A waterproof member may be applied to the speaker mesh 610. In this case, the speaker mesh 610 may block the inflow of external moisture into the case 300. In another example embodiment, the speaker mesh 610 may be disposed on the speaker conduit 312.

According to various example embodiments, the speaker conduit 312 of the case 300 may include a resonance space. For example, a sound output through the speaker 301 of the electronic device 200 may be amplified through the resonance space included in the speaker conduit 312, and then output to the outside of the case 300.

According to various example embodiments, the microphone 302 of the electronic device 200 may receive a sound from the outside of the case 300 through the internal microphone hole 321, the microphone conduit 322, and the external microphone hole 323 which are included in the second body 320 of the case 300. Referring to FIG. 6B, the internal microphone hole 321 may be positioned at a portion facing the microphone 302, and the internal microphone hole 321 may be connected to the external microphone hole 323 through the microphone conduit 322.

According to various example embodiments, the second elastic member 360 may be disposed around the internal microphone hole 321. The second elastic member 360 may partially seal between the internal microphone hole 321 and the microphone 302 of the electronic device 200. A part of the first elastic member 350 may be elastically deformed while the case 300 is closed, and thus brought in close contact with the periphery of the microphone 302 of the electronic device 200.

According to various example embodiments, a microphone mesh 620 may be disposed in at least one of the internal microphone hole 321 and the external microphone hole 323. The microphone mesh 620 is formed in a mesh structure so as to transmit a sound, and may also block the inflow of an external foreign substance into the case 300. A waterproof member may be applied to the microphone mesh 620. In this case, the microphone mesh 620 may block the inflow of external moisture into the case 300. In another example embodiment, the microphone mesh 620 may be disposed on the microphone conduit 322.

Figure 7:
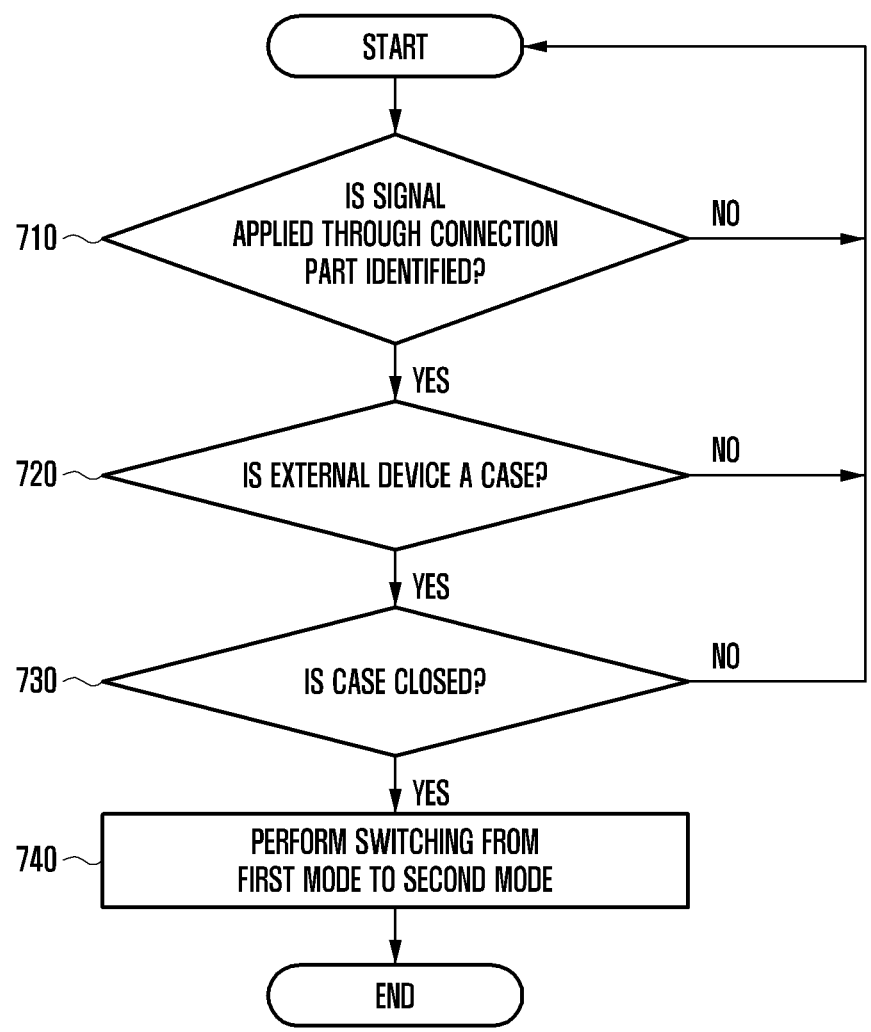
FIG. 7 is a flow chart illustrating an operation of an electronic device according to various example embodiments of the disclosure.

FIG. 7 is a flow chart illustrating an operation of an electronic device according to various example embodiments of the disclosure.

According to various example embodiments, the electronic device 200 accommodated in the case 300 may sense an external sound through the microphone 302, process information according to the sensed sound, and output the processed information to the outside through the speaker.

According to various example embodiments, a processor (e.g., the processor 120 of FIG. 1) of the electronic device 200 may identify whether the electronic device 200 has been accommodated in the case 300, and based on identifying that the electronic device 200 has been accommodated in the case 300, switching a mode of the speaker 301 and the microphone 302 of the electronic device 200 from a first mode to a second mode.

According to various example embodiments, in operation 710, a processor of the electronic device 200 may identify a type of an external device connected to the electronic device 200, based on a signal transferred through a connection part. According to an example embodiment, the external device may be the case 300 and the connection part may be the interface 177. In a state where the electronic device 200 is accommodated in the case 300, a terminal part of the case 300 and a connection part of the electronic device 200 may be in contact with each other. The processor may sense the connection between the electronic device 200 and an external device by sensing an electrical state change of the connection part. According to an example embodiment, the processor may sense the connection between the electronic device 200 and an external device by sensing a resistance change. The processor may transmit, through the connection part, an inquiry signal for identifying a type of an external device. In response to the inquiry signal, the external device may transmit, through the terminal part, a response signal to the electronic device 200, the response signal including information by which a type of an external device can be identified. According to some example embodiments, even though the processor of the electronic device 200 does not transmit an inquiry signal, by the connection between the connection part and the terminal part, a signal including a type of an external device may be transmitted to the processor of the electronic device 200 through the terminal part. According to an example embodiment, even though the processor of the electronic device 200 does not transmit an inquiry signal, a signal including a type of an external device may be transmitted to the processor of the electronic device 200 from the external device through the terminal part. According to an example embodiment, the electronic device 200 may identify that the electronic device 200 has been accommodated in the case 300 by performing communication with the case 300. For example, the electronic device 200 may identify that the electronic device 200 has been accommodate in the case 300 through methods of the communication with the case 300, such as power line communication (PLC), near field communication (NFC), or a wireless charging method.

According to various example embodiments, in operation 720, the processor may identify that a type of an external device is the case 300 by interpreting a signal transmitted from an external device connected to the electronic device 200. In operation 740, when a type of an external device is the case 300, and an external device connected to the electronic device 200 is the case 300, the processor may switch a mode of the speaker 301 and the microphone 302 from a first mode to a second mode. According to another example embodiment, in operation 730, when a type of an external device is the case 300, the processor may further identify whether the case 300 is opened or closed. For example, the attachment/detachment sensing sensor 630 capable of identifying whether the case 300 is opened or closed may be electrically connected to the terminal part and thus transmit, to the terminal part, a signal by which whether the case is opened or closed can be identified. The processor may receive, from the terminal part, a signal by which whether the case 300 is opened or closed can be identified, and thus switch a mode of the speaker 301 and the microphone 302 from a first mode to a second mode, depending on whether the case 300 is opened or closed. According to an example embodiment, in operation 740, the processor of the electronic device 200 may sense a closed state of the case 300, and thus switch a mode of the speaker 301 and the microphone 302 from a first mode to a second mode.

According to various example embodiments, in the second mode, the processor of the electronic device 200 may receive an external sound through the microphone 302, the external sound being introduced through the external microphone hole 323, the microphone conduit 322, and the internal microphone hole 321. The processor may process information according to the received sound. The processing of information may include a series of processes for recognizing the received sound and performing a function according to the recognized sound. For example, when the external sound is a sound such as "Let me know the weather", the processor may acquire weather information by accessing a server including weather information and identifying the weather. The processor may convert the processed information into a sound form, and then output the converted sound through the speaker 301. The sound output through the speaker 301 may be output to the outside of the case 300 through the internal speaker hole 311, the speaker conduit 312, and the external speaker hole 313.

According to various example embodiments, in the second mode, the processor of the electronic device 200 may control the speaker 301 and the microphone 302 differently from the first mode. In an example embodiment, the processor may perform control such that the sensitivity of the microphone 302 in the second mode is higher than the sensitivity of the microphone in the first mode. The control for the sensitivity may be performed to enable the microphone 302 disposed inside the case 300 to sense an external sound more sensitively. In addition, the processor may enable a high-pitched sound recognized by the microphone 302 in the second mode to be compensated further than that in the first mode. In an example embodiment, the processor may perform control such that the output of the speaker 301 in the second mode is higher than the output of the speaker in the first mode. For example, in the second mode, the output volume of the speaker may be higher than the output volume of the speaker in the first mode. In regard to the control for the output, it may be taken into consideration that a sound output through the speaker 301 may decrease while passing through the internal speaker hole 311, the speaker conduit 312, and the external speaker hole 313. In addition, the processor may enable the low-pitched output of the speaker 301 in the second mode to be lower than that in the first mode. In regard to this control, it may be taken into consideration that, as a sound output from the speaker 301 passes through the internal speaker hole 311, the speaker conduit 312, and the external speaker hole 313, a low-pitched sound thereof may be boosted by the resonance. In addition, according to the switching to the second mode, the processor may control the speaker 301 and the microphone 302 in consideration of acoustic features of the speaker 301 and the microphone 302 of the electronic device 200 accommodated in the case 300. In an example embodiment, the processor may consider acoustic features in a method of processing a sound to be output through the speaker 301 and/or a sound received through the microphone 302 differently from the first mode, without controlling the speaker 301 and the microphone 302. In an example embodiment, when the number of internal speaker holes 311, the number of speaker conduits 312, and the number of external speaker holes 313, which correspond to the speakers 301, are different, the processor may perform the acoustic output of the second mode differently from the first mode. For example, the processor may output a sound through the speaker 301 by changing stereo-type acoustic output into mono-type acoustic output.

According to various example embodiments, the processor of the electronic device 200 may control at least one element or component of the electronic device 200 in the second mode, differently from the first mode. According to an example embodiment, the at least one element or the component may be any one of the elements or components illustrated in FIG. 1. However, the disclosure is not limited thereto. For example, the processor may perform control to display information according to the received sound through a display (e.g., the display module 160 of FIG. 1 or the display modules 214-1 and 214-2 of FIG. 2) in the first mode, and not to display information according to the received sound through a display in the second mode. In another example, the processor may control elements such that in the second mode, the elements or components operate by using lower electric power than in the first mode.

According to various example embodiments, the processor of the electronic device 200 may perform switching to the first mode when a designated event occurs during the second mode. For example, the designated event may include an event in which the state of the case 300 is switched from a closed state to an opened state. In another example, the designated event may include an event in which the electronic device 200 is withdrawn from the case 300.

Figure 8:
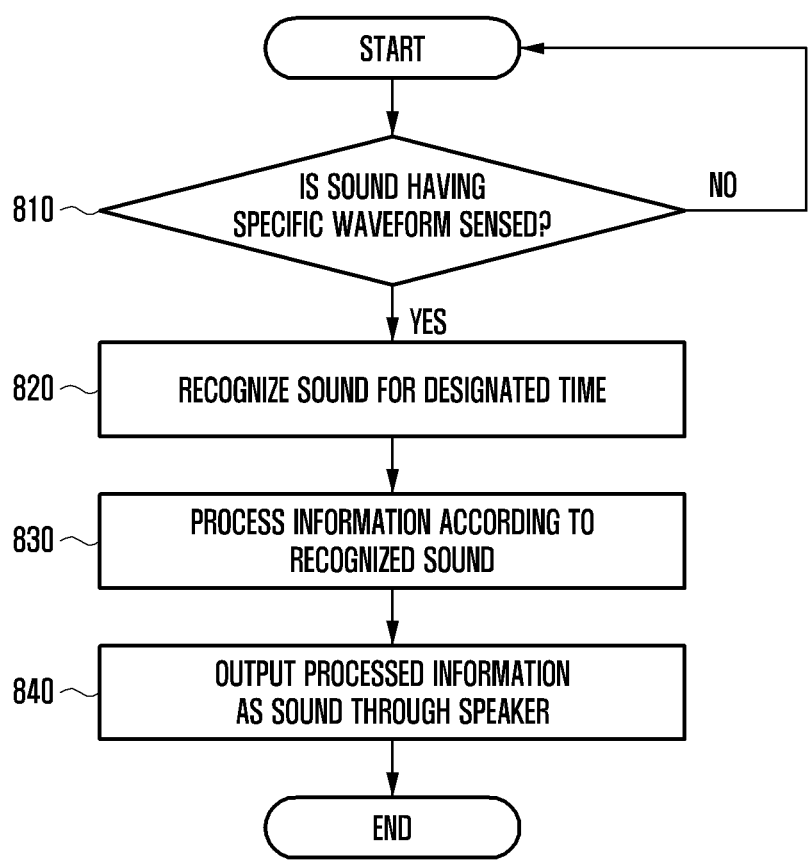
FIG. 8 is a flow chart illustrating an operation performed by an electronic device when a specific sound waveform is recognized, according to various example embodiments of the disclosure.

FIG. 8 is a flow chart illustrating an operation performed by an electronic device when a specific sound waveform is recognized, according to various example embodiments of the disclosure.

According to various example embodiments, in operation 810, the processor of the electronic device 200 may determine whether the waveform of the sound received through the microphone 302 indicates a sound having a specific waveform. For example, the processor may compare the waveform of the sound received through the microphone 302 with the waveform of a reference sound, and determine that the sound having a specific waveform has been sensed when a degree of matching between the received sound and the reference sound exceeds a reference degree. The reference sound may be a preconfigured sound and/or the reference degree may be a predetermined degree. According to various example embodiments, when the sound having a specific waveform is sensed, in operation 820, the processor may recognize, for a designated time, the sound received through the microphone. According to various example embodiments, in operation 830, the processor may process information in accordance with the recognized sound. According to various example embodiments, in operation 840, the processor may convert the processed information into a sound and then output the sound through the speaker 301.

For example, the processor may store a designated voice waveform (e.g., a waveform of a voice saying "Hi, Bixby"), and identify whether the waveform of the sound received through the microphone 302 matches a waveform that is the designated voice waveform (e.g., "Hi, Bixby"). When the waveform of the received sound matches the designated voice waveform, the processor may receive the sound for a configured time, process information according to the sound, and output the same through the speaker 301.

According to various example embodiments, in order to determine the waveform of a designated sound, a user's voice can be received and analyzed. The designated sound may be determined in a process of manufacturing the electronic device 200, and may be a sound that the user has selected randomly. By making the user read out a word or a sentence corresponding to a designated sound, the waveform of the designated sound can be stored.

Therefore, the processor may recognize a sound having a waveform which matches the waveform of a designated sound, and then process information in accordance with the sound that follows. Since the processor may not process information in accordance with all sounds recognized by the microphone 302, battery consumption due to the information processing can be reduced.

According to various example embodiments, there is provide a case 300 for accommodating an electronic device 200. The electronic device may include a first support part 221 and a second support part 222 which are rotatably connected to a body part 223; a speaker 301; and a microphone 302 may include: a first body 310; an accommodating part 330 formed to have a shape corresponding to the shape of the electronic device 200 so as to accommodate the electronic device 200 therein, and disposed in the first body 310; a second body 320 installed on the first body 310 so as to open or close the accommodating part 330; an internal speaker hole 311 formed through the accommodating part 330 at a portion facing the speaker 301 while the electronic device 200 is accommodated in the accommodating part 330; an external speaker hole 313 formed through the first body 310; a speaker conduit 312 formed in at least one of the first body 310 and the accommodating part 330 so as to connect the internal speaker hole 311 and the external speaker hole 313; an internal microphone hole 321 formed at a portion facing the microphone 302 while the electronic device 200 is accommodated in the accommodating part 330; an external microphone hole 323 formed through the second body 320; and a microphone conduit 322 formed in each of the second body 320 and the support parts so as to connect the internal microphone hole 321 and the external microphone hole 323.

In addition, the second body 320 may further include a support part for pressurizing, toward the accommodating part 330, the electronic device 200 accommodated in the accommodating part 330 in a state where the second body has closed the accommodating part 330, and the first body 310 may further include a guide groove 341 formed to have a shape corresponding to a lateral side of the body part 223 of the electronic device 200 such that the electronic device 200 is accommodated in the accommodating part 330 at a designated position in a designated direction.

In addition, the guide groove 341 formed in the first body 310 may be formed to have a shape corresponding to a guide protrusion 223-1 formed on the lateral surface of the body part 223 of the electronic device 200.

The case may further include a first elastic member 350 disposed along the edge of the internal speaker hole 311 wherein a part of the first elastic member is elastically deformed and thus partially seals between the internal speaker hole 311 and the speaker 301 of the electronic device 200 when the second body 320 closes the accommodating part 330 in a state where the electronic device 200 is accommodated in the accommodating part 330.

In addition, the case may further include a second elastic member 360 disposed along the edge of the internal microphone hole 321 wherein a part of the second elastic member is elastically deformed and thus partially seals between the internal microphone hole 321 and the microphone 302 of the electronic device 200 when the second body 320 closes the accommodating part 330 in a state where the electronic device 200 is accommodated in the accommodating part 330.

In order to block the inflow of an external foreign substance through the speaker conduit 312, the case may further include a speaker mesh 610 disposed in at least one of the internal speaker hole 311, the speaker conduit 312, or the external speaker hole 313.

In order to block the inflow of an external foreign substance through the microphone conduit 322, the case may further include a microphone mesh 620 disposed in at least one of the internal microphone hole 321, the microphone conduit 322, or the external microphone hole 323.

The case may further include a first magnetic member 510 disposed on the first body 310 at a portion thereof being in contact with the second body 320, and a second magnetic member 520 disposed on the second body 320 at a portion thereof corresponding to the first magnetic member 510.

The case may further include an attachment/detachment sensing sensor 630 disposed in at least one of the first body 310 and the second body 320 so as to sense a coupling and separation state between the first magnetic member 510 and the second magnetic member 520.

In addition, the attachment/detachment sensing sensor 630 may include a Hall sensor for sensing a magnetic field change.

The case may further include: a terminal part disposed in the accommodating part 330 such that the terminal part is in contact with a connection part of the electronic device 200 while the electronic device 200 is accommodated in the accommodating part 330; and a battery of the case 300, the battery being electrically connected to the terminal part.

According to an example embodiment of the disclosure, there is provided an electronic device 200, which may include a body part 223; transparent members 220 and 230 supported by the body part 223; a first support part 221 and a second support part 222 which are rotatably connected to the body part 223; display modules 214-1 and 214-2 for displaying information through the transparent members 220 and 230; a microphone 302 disposed in the body part 223; a speaker 301 disposed in at least one of the first support part 221 and the second support part 222; a connection part disposed in at least one of the body part 223, the first support part 221, and the second support part 222 so as to perform connection with an external device; and a processor 120 operatively connected with the display modules 214-1 and 214-2, the microphone 302, the speaker 301, and the connection part, wherein the processor 120 may identify whether the external device being in contact with the connection part is the case 300, based on a signal applied through the connection part, and perform switching from a first mode to a second mode, based on a result of the identification.

In addition, the second mode may be a mode in which the processor 120 may recognize, through the microphone 302, a sound introduced through the internal microphone hole 321 of the case 300, which faces the microphone 302, the external microphone hole 323 connected to the outside of the case 300, and the microphone conduit 322 for connecting the internal microphone hole 321 and the external microphone hole 323, and may output, through the speaker 301, information having been processed according to the recognized sound as a sound form by using the internal speaker hole 311 of the case 300, which faces the speaker 301, the external speaker hole 313 connected to the outside of the case 300, and the speaker conduit 312 for connecting the internal speaker hole 311 and the external speaker hole 313.

In addition, the second mode may be a mode in which the processor 120 controls the microphone 302 such that the sensitivity of the microphone 302 is higher than the sensitivity of the microphone in the first mode.

The second mode may be a mode in which the processor 120 controls the speaker 301 such that the output of the speaker 301 is higher than the output of the speaker in the first mode.

The second mode may be a mode in which the processor 120 controls the microphone 302 such that a high-pitched sound of the microphone 302 is further compensated than that in the first mode.

The second mode may be a mode in which the processor 120 controls the speaker 301 such that the low-pitched output of the speaker 301 is lower than the low-pitched output in the first mode.

In the second mode, the processor 120 may recognize a sound having a specific waveform through the microphone 302, process information in accordance with the sound recognized for a designated time after the recognition of the sound having a specific waveform, and then output the processed information through the speaker 301.

In addition, the processor 120 may identify whether the case 300 is opened or closed, based on a signal applied through the connection part, and switch a mode of the microphone 302 and the speaker 301 from the first mode to the second mode, based on the identification.

In the second mode, the processor 120 may process a sound received through the microphone 302 and a sound to be output through the speaker 301, differently from the first mode.

The disclosure including the drawings merely provide specific examples in order to easily explain the technical contents according to example embodiments of the disclosure and to help the understanding of example embodiments disclosed herein, and the scope of example embodiments of the disclosure is not limited thereto. Therefore, the scope of various example embodiments of the disclosure should be interpreted to include all changed or modified forms achieved based on the technical idea of various example embodiments disclosed herein, other than the example embodiments of the disclosure.

What is claimed is:

1. A case configured to accommodate an electronic device, which includes a speaker, a microphone, and a first support part and a second support part rotatably connected to a body part, the case comprising:
    a first body;
    an accommodating part provided in the first body and formed to have a shape corresponding to a shape of the electronic device, the accommodating part configured to accommodate the electronic device;
    a second body provided on the first body and configured to open or close the accommodating part;
    an internal speaker hole formed through the accommodating part at a portion of the accommodating part facing the speaker of the electronic device while the electronic device is accommodated in the accommodating part;
    an external speaker hole formed through the first body;
    a speaker conduit formed in at least one of the accommodating part or the first body, the speaker conduit configured to connect the internal speaker hole and the external speaker hole;
    an internal microphone hole formed at a portion facing the microphone of the electronic device while the electronic device is accommodated in the accommodating part;
    an external microphone hole formed through the second body; and
    a microphone conduit formed through the second body, the microphone conduit configured to connect the internal microphone hole and the external microphone hole.

2. The case of claim 1, further comprising:
    a pressurization part configured to press the electronic device accommodated in the accommodating part toward the accommodating part while the second body closes the accommodating part,
    wherein the first body further comprises a guide groove formed to have a shape corresponding to a lateral surface of the body part of the electronic device, guiding groove configured to guide the electronic device to be accommodated in the accommodating part at a designated position and in a designated direction.

3. The case of claim 2, wherein the guide groove formed in the first body is formed to have a shape corresponding to a guide protrusion formed on the lateral surface of the body part of the electronic device.

4. The case of claim 1, further comprising:
    a first elastic member provided along an edge of the internal speaker hole, wherein a part of the first elastic member is elastically deformed and partially seals between the internal speaker hole and the speaker of the electronic device while the second body closes the accommodating part including the electronic device.

5. The case of claim 1, further comprising:
a second elastic member provided along an edge of the internal microphone hole, wherein a part of the second elastic member is elastically deformed and partially seals between the internal microphone hole and the microphone of the electronic device while the second body closes the accommodating part including the electronic device.

6. The case of claim 1, further comprising:
a speaker mesh provided in at least one of the internal speaker hole, the speaker conduit, or the external speaker hole, the speaker mesh configured to block inflow of an external substance through the speaker conduit.

7. The case of claim 1, further comprising:
a microphone mesh provided in at least one of the internal microphone hole, the microphone conduit, or the external microphone hole, the microphone mesh configured to block inflow of an external foreign substance through the microphone conduit.

8. The case of claim 1, further comprising:
a first magnetic member provided on the first body at a portion of the first body in contact with the second body; and
a second magnetic member provided on the second body at a portion of the second body corresponding to the first magnetic member.

9. The case of claim 8, further comprising:
a sensor provided in at least one of the first body and the second body, the sensor configured to sense coupling and separation states between the first magnetic member and the second magnetic member.

10. The case of claim 9, wherein the sensor comprises a Hall sensor configured to sense a magnetic field change.

11. The case of claim 1, further comprising:
a terminal part provided in the accommodating part such that the terminal part is in contact with a connection part of the electronic device while the electronic device is accommodated in the accommodating part; and
a case battery electrically connected to the terminal part.

12. The case of claim 1, further comprising the electronic device, wherein the electronic device comprises,
a transparent member supported by the body part,
a display configured to display information using the transparent member,
a connection part provided in at least one of the body part, the first support part, and the second support part, the connection part configured to perform a connection with an external device, and
a processor operatively connected with the display, the microphone, the speaker, and the connection part, wherein the processor is configured to:
identify whether the external device being in contact with the connection part is a case, based on a signal applied through the connection part, and
perform switching from a first mode to a second mode, based on a result of the identification that the external device is the case.

13. The case of claim 12, wherein, in the second mode, the processor is further configured to:
recognize, through the microphone, a sound received through an internal microphone hole of the case, which faces the microphone, an external microphone hole connected to the outside of the case, and a microphone conduit configured to connect the internal microphone hole and the external microphone hole, and
output, through the speaker, information processed according to the recognized sound as a sound by using an internal speaker hole of the case, which faces the speaker, an external speaker hole connected to the outside of the case, and a speaker conduit configured to connect the internal speaker hole and the external speaker hole.

14. The case of claim 12, wherein, in the second mode, the processor is further configured to control the microphone to have a sensitivity higher than a sensitivity in the first mode.

15. The case of claim 12, wherein, in the second mode, the processor is further configured to control the speaker to output at a volume higher than a volume in the first mode.

16. The case of claim 12, wherein, in the second mode, the processor is further configured to control the microphone to further compensate a high-pitched sound of the microphone than in the first mode.

17. The case of claim 12, wherein, in the second mode, the processor is further configured to control the speaker to output a low-pitched sound lower than a low-pitched sound in the first mode.

18. The case of claim 12, wherein, in the second mode, the processor is further configured to recognize a sound having a specific waveform through the microphone, process information in accordance with the sound recognized for a designated time after the recognition of the sound having the specific waveform, and output the processed information through the speaker.

19. The case of claim 12, wherein the processor is further configured to identify whether the case is opened or closed, based on a signal applied through the connection part, and switch the microphone and the speaker from the first mode to the second mode, based on a result of the identification.

20. The case of claim 12, wherein, in the second mode, the processor is further configured to process the first sound received through the microphone and the second sound to be output through the speaker differently from the first mode.

* * * * *